United States Patent

Maj et al.

Patent Number: 5,422,418
Date of Patent: Jun. 6, 1995

[54] POLYAMIDES AND OBJECTS OBTAINED FROM THEM

[75] Inventors: Philippe Maj, Bad Honnes, Germany; Jean-Marc Sage, Serquigny, France; Philippe Blondel, Bernay, France; Didier Judas, Paris, France

[73] Assignee: Elf Atochem S.A., France

[21] Appl. No.: 999,485

[22] Filed: Dec. 30, 1992

[30] Foreign Application Priority Data

Dec. 31, 1991 [FR] France ................ 91 16405

[51] Int. Cl.$^6$ .............. C08G 69/08; C08G 69/14; C08G 69/36
[52] U.S. Cl. .................. 528/324; 528/326; 528/329.1; 528/331
[58] Field of Search ............ 528/324, 329.1, 331, 528/326

[56] References Cited

U.S. PATENT DOCUMENTS

| | | | |
|---|---|---|---|
| 4,113,708 | 9/1978 | Chapman et al. | 528/324 |
| 4,218,509 | 8/1980 | Edgar et al. | 528/324 |
| 5,081,222 | 1/1992 | Reimann et al. | 528/324 |

FOREIGN PATENT DOCUMENTS 1246898  12/1969  United Kingdom.

OTHER PUBLICATIONS

Patent Abstracts of Japan, vol. 11 No. 394 (C465) (2841), Dec. 1987.

*Primary Examiner*—John Kight, III
*Assistant Examiner*—P. Hampton-Hightower
*Attorney, Agent, or Firm*—John L. Sigalos

[57] ABSTRACT

The present invention relates to new polyamides comprising, on a mass basis:

(a) 45 to 75% of an x,T unit, x being between 4 and 12 inclusive, the x,T unit being the condensation product of a diamine having x carbon atoms and of terephthalic acid, and (b) 55 to 25% of an aliphatic unit $-HN-(CH_2)_n-CO$, n being between 6 and 14 inclusive. and the terpolyamides obtained by including a monomeric unit (c) such as the unit 6 or 6,I as a replacement for part of the aliphatic unit (b).

The polyamide compositions thus obtained exhibit a Tg lower than 130° C., a Tm higher than 230° C. and a good crystallizability.

18 Claims, 1 Drawing Sheet

POLYAMIDES AND OBJECTS OBTAINED FROM THEM

The present invention relates to new polyamides, new compositions containing them and to the objects, such as mouldings, obtained from them.

Polyamides are commonly employed in various types of industry. Improved properties, both mechanical and chemical, are sought after in the case of the objects obtained from polyamides, but the economic requirements of feasibility on an industrial scale remain. Thus, there is a requirement for polyamides exhibiting a high melting point Tm which can therefore be employed at high temperatures, furthermore exhibiting good mechanical properties, good resistance to various solvents and the like. These polyamides must also easily result in moulded objects, and must do so on an industrial scale.

In order that the polymer may develop its properties during the moulding, especially in the case of crystalline or semicrystalline materials, it is preferable that the glass transition temperature (Tg) should not be too high in relation to the mould temperature; moreover, it is preferable that the material should offer a high rate of crystallisation; in fact, if the rate of crystallisation is too low during the moulding, the material will not exhibit its optimum properties. The temperature Tg which is lower than approximately 130° C. is a condition dictated by the moulding, on an industrial scale, which employs water as a heat transfer fluid in the moulds. Moreover, the lower the Tg, the less high is the energy consumption. Thus, there is a requirement in industry for polyamides whose Tg is lower than 130° C., and Tm higher than 250° C., exhibiting a rate of crystallisation which is sufficiently high for the polymer to be capable of developing its properties during moulding operations, and whose mechanical, chemical and reactor feasibility properties are furthermore raised.

Among the known means in the literature which allow this crystallisation to be accelerated there may be mentioned the addition of nucleating agents such as, for example, talc, in order to accelerate this crystallisation. However, the addition of these nucleating agents can present disadvantages, especially by lowering the impact strength or the elongation at break of the polymer.

ICI Patent FR 2,123,534 claims polyamides which may comprise, on a weight basis:
 -10 to 80% of 6, T unit
 -1 to 70% of 12 unit
 -1 to 80% of 6 unit Nevertheless, this patent gives as an example only polyamides in which the content of 6, T unit is low (10 and 18.5% by weight), the said polymers therefore having melting points which are not very high. They are therefore not very appropriate for industrial uses in the case of which a high Tm is required, the said Tm being directly a function of the content of 6, T unit.

Mitsui Patent JP 62/156,130 describes and claims random polyamides comprising, on a molar basis:
 -60 to 90% of 6, T
 -5 to 40% of 12
 -0 to 35% of 6, I and exhibiting a flow rate (MFR: Mean Flow Rate) higher than 0.1 g/min (10 kg at 360° C.).

This patent teaches that, in the case of 6, T contents lower than 60 mol % and concurrently aliphatic unit contents exceeding 40 mol %, the polyamide loses some of its properties, such as the lowering of the melting point, the lowering of the distortion temperature (HDT) in the case of the filled polymer and the like.

There are furthermore known copolyamides of the 6—6, T type (cf. BASF Patent EP-A-299,444), as well as homopolyamides based on 6, 12 and 11 units. The melting temperature Tm of the homopolymer based on 6 unit is approximately 30° C. higher than that of the 12 or 11 homopolymer, whereas the glass transition temperatures Tg of the 6, 12 and 11 homopolymers are substantially identical to within a few ° C. The copolyamide 6/6, T, in the case of contents of 6, T units of the order of 50%, has a melting temperature Tm of the order of 200 to 230° C. and a Tg of the order of 90° C. Therefore, the replacement, in 6—6, T copolymers containing, on a mass basis, less than 60% of 6, T unit, of the 6 component by a component of the type -HN-(CH$_2$)n-CO-, n being between 6 and 14, typically 12 (or 11), would result a priori in copolymers which have a similar Tg, but whose Tm would be decreased.

Surprisingly, the applicant has found that a high melting temperature, that is to say a Tm higher than 230° C., as well as a glass transition temperature Tg lower than that of the 6—6, T copolyamides, that is to say lower than approximately 130° C., and good mechanical and chemical properties can be obtained by virtue of the polyamides according to the present invention.

In addition, the polyamides according to the present invention exhibit a crystallisation which is faster than the well-known copolyamides of 6/6T or 6, I/6, T type. The rate of this crystallisation is here observed as the measured difference between the melting temperature (Tm) of the polymer and its crystallisation temperature (Tc). In the case of polymers, the observed difference between the crystallisation temperature and the melting temperature (that is Tm−Tc) is indicative of the speed of the polymer to be crystallised. The faster the crystallisation, the smaller the difference Tm−Tc (at comparable heating or cooling rates during measurements). Pages 890 and 891 of "Comprehensive Polymer Science", Pergamon Press Volume 1, and the references cited therein (especially H.N. Beck, J. Appl. Polym. Sci. 1975 (19), p. 371) can be given in support.

Thus, the present invention provides a polyamide comprising, on a mass basis:

a) 45 to 75% of x,T unit, x being between 4 and 12 inclusive, the x,T unit being the condensation product of a diamine having x carbon atoms and of terephthalic acid; and b) 55 to 25% of aliphatic unit -HN-(CH$_2$)n-CO, n being between 6 and 14 inclusive.

The term "x,T" as employed in the present description means the unit obtained from a substantially stoichiometric mixture of the diamine H$_2$N-(CH$_2$)x-NH$_2$ - corresponding to "x"-and of terephthalic acid–corresponding to "T". "Substantially stoichiometric" is intended to mean a molar ratio "x"/"T" of between 1/1.05 and 1.05/1. Mixtures of these units are also envisaged in the present invention. The aliphatic unit -HN-(CH$_2$)n-CO is derived from a lactam or from the corresponding α,ω-aminocarboxylic acid containing n+1 carbon atoms in the carbon chain. Mixtures of these units are also envisaged in the present invention. The term "inclusive", as employed in the present description includes the limits of the range which is stated.

According to a preferred embodiment of the present invention the polyamide comprises, on a mass basis:

a) 55 to 70% of x,T unit, x being between 4 and 12 inclusive; and b) 45 to 30% of aliphatic unit -HN-$(CH_2)_n$-CO, n being between 6 and 14 inclusive.

In the x,T unit, x is preferably between 6 and 9 inclusive. This x,T unit is advantageously the unit 6, T which originates from the condensation of hexamethylenediamine (HMDA) with terephthalic acid. In the aliphatic unit -HN-$(CH_2)_n$-CO, n is preferably between 7 and 11 inclusive. This aliphatic unit is advantageously the 12 and/or 11 unit. The term "12" or "11" as employed in the present description denotes the aliphatic unit obtained from, as precursor, α,ω-aminocarboxylic acid or from the corresponding lactam. Thus, the unit 12 originates from 12-aminododecanoic acid or from the corresponding lactam, that is to say lauryllactam or lactam 12 (L12) and the unit 11 originates from 11-aminoundecanoic acid. Mixtures of these two aliphatic units are also envisaged.

According to a preferred embodiment of the present invention the aliphatic unit is the unit 12. The latter advantageously originates from the corresponding lactam, that is to say lauryllactam L12 as precursor.

Thus a preferred polyamide according to the present invention is the polyamide 12(11)-6, T.

The present polyamides may include other monomeric units c). These monomeric units c) are present instead of part of the aliphatic unit b). Thus, a further subject of the present invention is the polyamide characterised in that it comprises a third monomer partly replacing the aliphatic unit, the said aliphatic unit being present in a proportion of at least 10% on a mass basis, based on the total weight of the final composition. The aliphatic unit is preferably present in a proportion of at least 15% on a mass basis, based on the total weight of the final composition.

Figure 1:
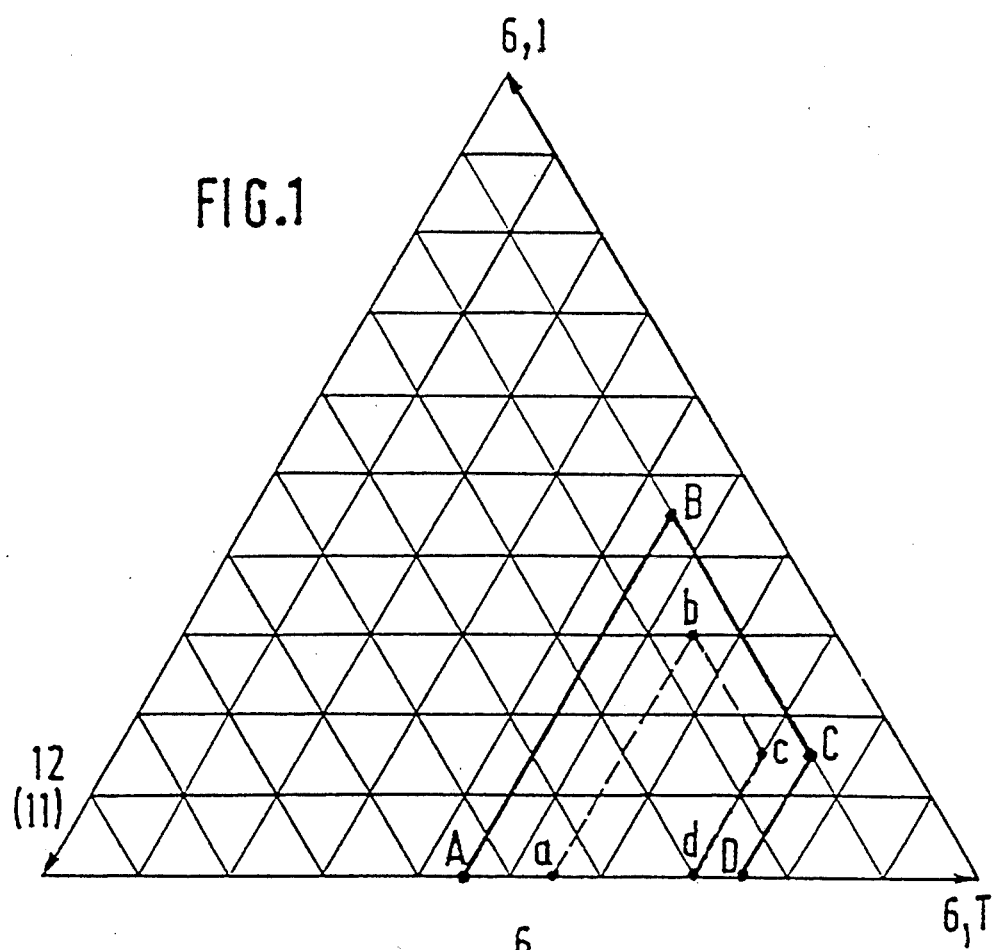
FIG. 1 shows a ternary composition diagram of a polyamide according to the present invention.

According roan embodiment of the present invention the unit c) is the 6, I unit. The 6, I unit is present in a proportion of up to 45% on a mass basis, based on the total weight. The proportion of the said 6, I unit is preferably up to 30% on a mass basis, based on the total weight. FIG. 1 is a ternary diagram of a 12-6, T-6, I terpolymer according to the present invention. The representative point is situated in the region ABCD, preferably abcd, of the said FIG. 1.

The term "6, I" as employed in the present description means the unit obtained from a substantially stoichiometric mixture of HMDA ("6") and of isophthalic acid ("I").

According to another embodiment of the present invention the unit c) is the 6 unit. The 6 unit is present in a proportion of up to 40% on a mass basis, the x,T unit being present in a proportion of at least 50% on a mass basis, based on the total weight of the final composition. The proportion of the said 6 unit is preferably up to 30% on a mass basis, based on the total weight of the final composition.

Figure 2:
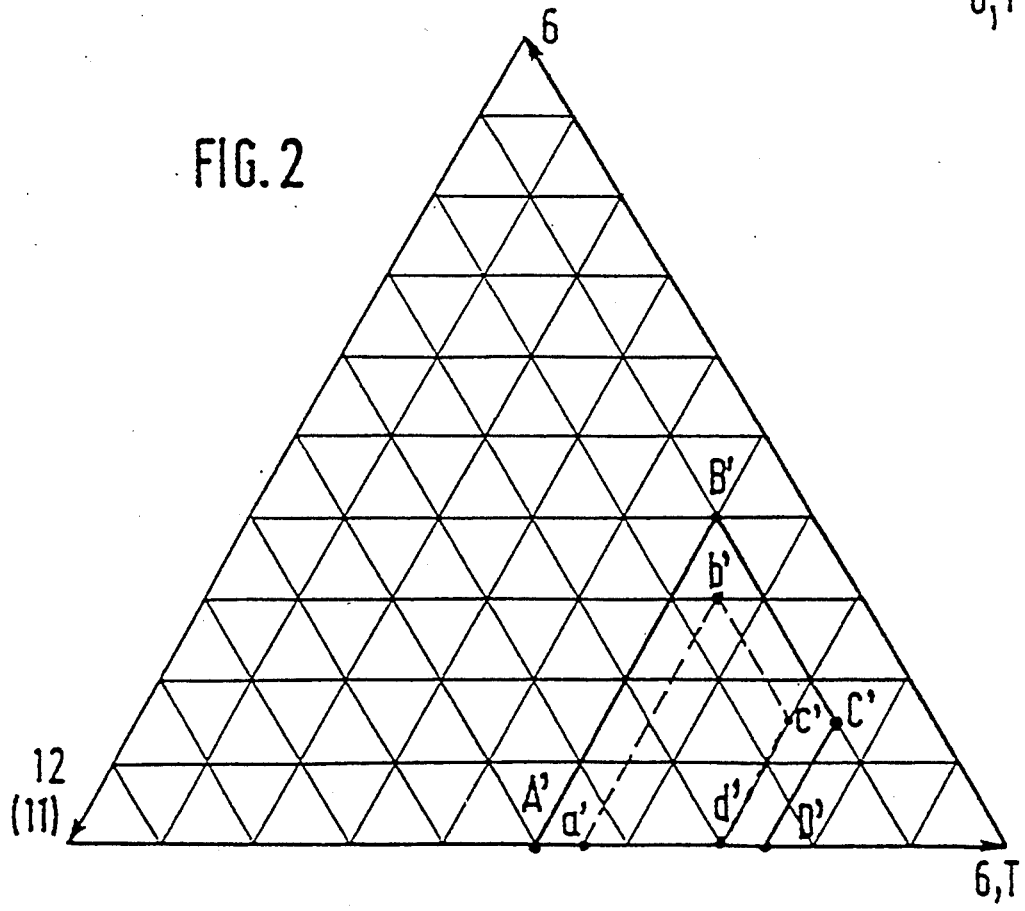
FIG. 2 shows a ternary composition diagram of another polyamide according to the invention. The numbers in the Figures refer to the examples.

FIG. 2 is a ternary diagram of a 12-6, T-6 terpolymer according to the present invention. The representative point is situated in the region A'B'C'D', preferably a'b'c'd', of the said FIG. 2.

The term "6" as employed in the present description means the aliphatic unit obtained from 6-aminohexanoic acid or from the corresponding lactam, that is to say ε-caprolactam L6. The preferred precursor is caprolactam L6.

The polyamides may also include the usual additives for polyamides, such as: light and heat stabilisers, colorants, optical brighteners, plasticisers, demoulding agents, flame-retardant agents and others. The polyamides according to the present invention may also be mixed with other homo- or copolyamides, added in a proportion of up to 100% relative to the polyamide according to the present invention.

The polyamides according to the present invention may also be mixed with other polymers, for example copolymers of ethylene, maleic anhydride and..methyl, ethyl or butyl acrylares, for example, these Copolymers being generally employed in order to improve the impact strength properties in contents of the order of 1 up to 40% on a mass basis.

It is also possible to add nucleating agents which are known to a person skilled in the art, such as talc, generally in contents of 0.1 to 15% by weight. Preference may be made to the Hitch U.S. Pat. No. 3,755,221 (Aug. 28, 1973) which describes nucleating agents for polyamides 6,6.

A further subject of the present invention is the compositions containing the abovementioned polyamides in combination with a filler present in a quantity of up to 200 preferably from 10 to 60%, by weight relative to the present polyamide. The fillers envisaged within the scope of the present invention include conventional inorganic fillers such as the fillers chosen from the group, given without any limitation being implied, comprising: kaolin, magnesia, slag, etc., glass fibres. The filler employed more generally consists of glass fibres whose size is advantageously of between 0.20 and 25 mm inclusive. Included therein may be a coupling agent for improving the adhesion of the fibres to the polyamide, such as the silanes or the titanates which are known to a person skilled in the art. Organic fillers may also be employed, such as graphite or aramid fibres (entirely aromatic polyamides).

Another subject of the present invention is the articles obtained from the abovementioned polyamides or compositions.

According to a preferred embodiment of the present invention the article is an article obtained by moulding, advantageously by injection moulding.

The polyamides according to the present invention can be obtained by any processes for the preparation of the appropriate polyamides.

Nonlimiting examples of preparative processes are given below, which relate to HMDA as diamine. The description is given with respect to the 6, T unit, for sake of illustration, without any limitation being implied.

According to a first process in accordance with the present invention, the said process comprises the single stage of reaction between terephthalic acid and, optionally, isophthalic acid, with the precursor of the aliphatic unit and, optionally, that of the 6 unit, and HMDA. The operating conditions are a temperature of 250 to 360° C., preferably 280 to 320° C., an inert atmosphere, a pressure of 0.01 to 50 bar, preferably 10 to 35, and a reaction time of 30 minutes to 10 hours.

According to a second process in accordance with the present invention, the said process comprises the stages of:

- reaction between terephthalic acid, and optionally isophthalic acid, with the precursor of the aliphatic unit, and optionally that of the 6 unit; and
- reaction of the diacid oligomer thus formed with HMDA.

In the first reaction stage the diacid oligomer is prepared by condensation of terephthalic acid, or optionally of its mixture with isophthalic acid, with the precursor of the aliphatic unit. This precursor may be 12-aminododecanoic or 11-aminoundecanoic acid or lauryllactam 12. The reaction takes place in a reactor under inert atmosphere, at atmospheric pressure and/or under pressure while the reactants are maintained, preferably with stirring, at a temperature between 150 and 350° C. inclusive and preferably between 240 and 300° C. inclusive. Reaction generally takes place in 1 to 5 hours at atmospheric pressure or under a maximum pressure of 50 bar.

In the second stage the diamine is added at atmospheric pressure to the diacid oligomer formed, for example HMDA, which is reacted at a temperature between 260 and 350° C. inclusive, preferably 240 and 300° C. The reaction generally takes place in an inert atmosphere in one to 10 hours under vacuum and/or at atmospheric pressure and/or a maximum pressure of 50 bar. The molar ratios of HMDA/terephthalic acid optionally mixed with isophthalic acid vary between 1/0.90 and 0.90/1.

According to a third preparative process in accordance with the present invention, the said process comprises the stages of:

a) reaction between terephthalic acid, and optionally isophthalic acid, and the precursor of the aliphatic unit of 10 to 99% and preferably of 35 to 75% by weight of the diamine HMDA; and b) reaction of the product thus formed with the remainder of HMDA.

In both stages the temperature is between 240 and 350° C. inclusive, preferably 280 and 330° C. The process is performed under inert atmosphere, at a pressure up to 50 bar or at atmospheric pressure, or under vacuum. The reaction generally takes place in 1 to 10 hours.

Known polyamidification catalysts such as phosphoric and hypophosphorous acids can be employed in the processes according to the present invention, preferably during the second stage where the latter two processes are concerned.

The usual fillers or additives referred to above can be added to the reaction mixture during the second stage.

A fourth preparative process according to the present invention comprises a first stage of polymerisation up to a degree of conversion of between 40 and 99% inclusive, followed by a second stage consisting of a viscosity rise. The first stage can be carried out using a conventional process, for example one of the abovementioned three processes. At the end of this stage the prepolymer can be transferred directly into a machine of the extruder type or else a horizontal reactor, which permit residence times varying from 5 minutes to 1 hour, preferably 15 to 45 minutes, in order to undergo a viscosity recovery. The transfer can also be performed via the recovery of the solid prepolymer in the form of granulate or powder.

The present invention is illustrated with the aid of the following examples, which do not limit its scope, it being capable of alternative forms which are easily accessible to a person skilled in the art.

In the following examples the determination of the melting points is provided by DSC analysis - the DSC analysis is performed using a Perkin Elmer DSC4 apparatus. The sample is subjected to a first heating cycle from room temperature to 350° C. at 20° C./min, followed by cooling at 40° C./min to room temperature; during this cooling the crystallisation temperature Tc is recorded at the maximum of the exotherm peak. A second heating cycle of temperature rise is then performed (20° C./min). The melting points and the glass transition temperature are determined from this second cycle, the glass transition temperature being determined at the point of inflexion and the melting temperature being given by the minimum of the melting endotherm peak observed.

In the following examples the inherent viscosity is measured at 25° C. in meta-cresol with an initial concentration of 0.5 g of polymer per 100 g of meta-cresol. It is expressed in dl/g.

The mechanical tests are performed on test pieces obtained by injection moulding, the polymer in granulate form being dried beforehand in an oven for 8 hours under vacuum at 80° C. before injection moulding. The test specimens undergo a standard conditioning for 14 days at 23° C. under air containing 50% relative humidity before analysis.

The results of examples 1 to 15 are reported in Table A below.

EXAMPLE 1

A glass reactor (height 200 mm, diameter 40 mm) fitted with a glass anchor stirrer is employed. The reactor is fitted with a Vigreuxcolumn followed by a vertical condenser making it possible to collect the water of condensation in a graduated test tube. The reactants are introduced into the reactor in powder form, generally, the charged reactor is then left under a gentle nitrogen purge for 30 to 60 min in order to remove the traces of oxygen. The nitrogen flow rate is then decreased in order to keep the reactor merely under nitrogen (bubble by bubble).

27.95 g of 12-aminododecanoic acid, 16.6 g of terephthalic acid and 12 g of HMDA are introduced.

The reactor is immersed in the heating bath maintained at 250° C.; after 5 min the stirring is switched on at 25 rev/min; the reaction mixture is then pasty. The temperature is then raised progressively to 300° C. at approximately 1° C./min. At 260° C. the mixture becomes more fluid and stirring is increased to 100 rev/min. During this temperature rise the polycondensation effluents are seen to distil, the mixture progressively becomes more transparent (complete melting) and its viscosity increases. At about 300° C. the mixture has the consistency of a very thick paste, the stirring is decreased after 20 min at 300° C. (25 rev/min) and is then maintained for another 20 min, at the end of which no further change in the mixture is being seen. The reaction is then stopped. The total volume of the effluents is 6 ml (5.76 ml of water in theory).

The polymer obtained has a glass transition temperature of 68° C. and a melting temperature of 267° C.

EXAMPLE 2

21.5 g of 12-aminododecanoic acid, 16.6 g of terephthalic acid and 12 g of HMDA are introduced into the reactor of Example 1.

The reactor is immersed in the heating bath maintained at 240° C.; after 10 min the stirring is switched on at 25 rev/min; the reaction mixture is then pasty. The temperature is then raised to 260° C., the mixture then becomes more fluid and stirring is increased to 100 rev/min; the reaction is kept thus for 20 min at 260° C. The temperature of the bath. is then increased progressively to 300° C. over a period of 30 min. During this temperature rise the polycondensation effluents are seen to distil, the mixture progressively becomes more transparent and its viscosity increases. At about 300° C. the mixture has the consistency of a very thick paste. The stirring is decreased (25 rev/min). The temperature of the bath is increased again to 310° C. over 15 min, at the end of which the reaction is stopped. The total volume of the effluents is 5.5, ml (5.4 ml of water in theory).

The polymer obtained has an inherent viscosity of 0.71, a glass transition temperature of 73° C. and a melting temperature of 276° C.

EXAMPLE 3

25.8 g of 12-aminododecanoic acid, 16.6 g of terephthalic acid and 12 g of HMDA are introduced into the reactor of Example 1.

The reactor is immersed in the heating bath maintained at 240° C.; after 10 min the stirring is switched on at 25 rev/min; the reaction mixture is then pasty. The temperature is then raised to 250° C., the mixture then becomes more fluid and the stirring is increased to 50 rev/min; the reaction is kept thus for 10 min at 280° C. The temperature of the bath is then increased progressively to 300° C. over a period of 10 min. During this temperature rise the polycondensation effluents are seen to distil, the mixture progressively becomes more transparent (complete melting) and its viscosity increases. At about 300° C. the mixture has the consistency of a very thick paste, the stirring is decreased (25 rev/min). The heating bath is kept at 300° C. for 45 min, at the end of which no further change in the mixture is being seen; the reaction is then stopped. The total volume of the effluents is 6 ml (5.76 ml of water in theory).

The polymer obtained has an inherent viscosity of 0.87, a glass transition temperature of 71° C. and a melting temperature of 275° C. (another melting temperature minimum at 255° C. is detected on the DSC plot).

EXAMPLE 3.1

A 50-1 autoclave is charged with 5.94 kg of lactam 12, 4.16 kg of terephthalic acid and 1.49 kg of HMDA (97% purity) (that is 50% of the stoichiometry). The closed reactor is heated to 280° C. and then kept at this temperature for 90 min with stirring set at 30 rev/min; the pressure in the reactor steadies at 17 bar. After this hold at 280° C. an isothermal (280° C.) pressure letdown of the reactor is performed to a pressure of 0.5 bar; this let-down is performed progressively over 60 min. The remainder of the diamine is then introduced into the reactor by means of a pump, that is 1.49 kg of HMDA. The pressure in the reactor then rises again to stabilise at 15 bar at 280° C. This operation (introduction of the diamine and stabilisation of the reactor at 280° C., 15 bar) takes 50 min. The reaction mixture is again kept at 280° C., 15 bar for 90 min. A pressure let-down is then performed at the same time as an increase in the stock temperature; these being then changed from 280° C. to 3.17° C. and from 15 bar to atmospheric pressure, progressively over 65 min. The stirrer torque increases and the polymer is taken out of the reactor 6 min after the end of this let-down. Its inherent viscosity is 1.2 and its MFI (Melt Flow Index) is 4.1 g/10 min at 300° C/2.16 kg (2-095 mm diameter die).

EXAMPLES 4 to 6

The operation is carried out under the conditions of Example 3 in the case of copolyamides with a mass composition as 12/6, T: 39/61, 40/60 and 55/45 respectively.

EXAMPLE 7

This test is performed by employing the polycondensation technique by means of viscosity increase of a prepolymer in the solid state in the presence of phosphoric catalyst.

The synthesis of a prepolymer which has a degree of conversion of the reaction of approximately 60% is performed in a first step. The product is then cooled and ground and then undergoes a heat treatment under a nitrogen stream at a temperature below its melting point.

The glass reactor is charged with 12.9 g (0.06 mol) of 12-aminododecanoic acid, 16.6 g of terephthalic acid (0.1 mol), 12 g (0.103 mol) of HMDA and 0.1 g of 85% phosphoric acid. The tube is immersed in the bath which is heated to 220° C. The temperature is rapidly raised to 260° C. (10 min), the stirring is then switched on at 25 rev/min. The temperature is then raised to 300° C. in 20 min. During this temperature rise, melting of the monomers and a release of water of polycondensation are observed. The reaction is stopped when 300° C. are reached. 3.0 ml of water have then been collected (that is 60% of the 4.7 ml of theoretical effluents).

DSC analysis shows a glass transition temperature of 81.5° C. and a melting temperature of 315° C. (the melting point during the first heating in DSC is 275° C.).

35 g of the product obtained are then cooled and ground in a laboratory mill to obtain a powder. This powder is taken up in a glass reactor which is kept stirred (25 rev/min) and under a nitrogen stream (approximately 60 1/h). The reactor is immersed in the bath maintained at 210° C. A rapid temperature rise up to 260° C. (10 min) is then performed and then a slower rise to 290° C. (15 min). A plateau is maintained at the temperature of 290° C. for 90 min. At the end of this time an additional volume of 1.2 ml of effluents is collected (1.5 in theory); the reaction is stopped.

DSC analysis shows a melting point of 313° C. and a glass transition temperature of 91° C.

A second operation is carried out; the product obtained (coarse powder) is resubjected to a temperature of 290° C. for 180 min under nitrogen in the same way as above.

A glass transition temperature of 93.7° C. and a melting point of 315° C. are finally obtained.

EXAMPLES 8 and 9

The operation is carried out under the conditions of Example 3 with 12-aminododecanoic acid replaced with 11-aminoundecanoic acid. The 11-6, T copolyamides obtained have the following mass compositions: 40/60, 49/51, respectively.

EXAMPLE 10 (comparative)

The operation is carried out under the conditions of Examples 8 and 9, that is to say with 11-aminoundecanoic acid. The polyamide obtained has a mass composition of 60/40.

EXAMPLES 11 to 15 (comparative)

The operation is carried out under the conditions of Example 3, for 12/6, T copolyamides of respective mass compositions: 60/40, 70/30, 80/20, 90/10 and 95/5.

TABLE A

| Ex. | mass % 12 | 6,T | Tg | Tm | Tc | Tm-Tc | ΔH cal/g |
|---|---|---|---|---|---|---|---|
| 1 | 51 | 49 | 68 | 267 | — | — | — |
| 2 | 44 | 56 | 73 | 276 | — | — | 3 |
| 3 | 50 | 50 | 71 | 275 | 220 | 55 | 3 |
| 3.1 | 50 | 50 | 77 | 277 | — | — | — |
| 4 | 39 | 61 | 81 | 290 | — | — | 10 |
| 5 | 40 | 60 | 74 | 288 | 247 | 41 | 8 |
| 6 | 55 | 45 | 66 | 250 | — | — | 4 |
| 7 | 32 | 68 | 94 | 315 | — | — | 6 |
| 8 (11) | 40 | 60 | 81 | 293 | — | — | 3 |
| 9 (11) | 49 | 51 | 73 | 271 | — | — | 4 |
| 10 (11) | 60 | 40 | 67 | 230 | — | — | 2 |
| 11 | 60 | 40 | 58 | 220–230 | — | — | 1 |
| 12 | 70 | 30 | 58 | amorphous | — | — | 0 |
| 13 | 80 | 20 | — | 147 | — | — | 6 |
| 14 | 90 | 10 | — | 161 | — | — | 9 |
| 15 | 95 | 5 | — | 170 | — | — | 11 |

EXAMPLES 16 and 17 (comparative)

The operation is carried out under the operating conditions of Example 3, except for the fact that isophthalic acid is mixed with terephthalic acid and that the aliphatic unit is absent. The 6, T/6, I copolyamides obtained have the respective mass compositions: 50/50 and 60/40.

EXAMPLES 18 to 23

The operation is carried out under the operating conditions of Example 3, except for the fact that isophthalic acid is mixed with terephthalic acid. The percentages shown for the 6, I unit are on a mass basis and are based in relation to the final 12–6, T–6, I copolyamide.

The results of Examples 16 to 23 are given in Table B below.

TABLE B

| Ex. | 12 | 6,T | 6,I | Tg | Tm | Tc | Tm-Tc | ΔH cal/g |
|---|---|---|---|---|---|---|---|---|
| 16 | 0 | 50 | 50 | 126 | 270 | 193 | 77 | 6–7 |
| 17 | 0 | 60 | 40 | 123 | 286 | 241 | 45 | 11.3 |
| 18 | 13 | 60 | 27 | 112 | 293 | 237 | 56 | 9.5 |
| 19 | 17 | 50 | 33 | 101 | 265 | 194 | 71 | 7 |
| 20 | 17 | 73 | 10 | ~100 | >320 | — | — | — |
| 21 | 23 | 67 | 10 | ~100 | >320 | — | — | — |
| 22 | 27 | 60 | 13 | 89 | 294 | 257 | 37 | 9.6 |
| 23 | 33 | 50 | 17 | 92 | 274 | 210 | 64 | 5.1 |

EXAMPLES 24 to 27 (comparative)

The operation is carried out under the operating conditions of Example 3, except for the fact that the unit 6 is introduced instead of the unit 12. 12-aminododecanoic acid is replaced with aminocaproic acid.

EXAMPLES 28 to 30 (comparative)

The operation is carried out under the operating conditions of Example 3, the unit 12 being partly replaced with the unit 6. The percentages shown for the unit 6 are on a molar basis and are based in relation to the final 12–6, T–6 terpolyamide.

EXAMPLES 31 to 34

The operation is carried out under the operating conditions of Examples 28 to 30.

The results of Examples 24 to 33 are reported in Table C below.

TABLE C

| Ex. | 12 | 6,T | 6 | Tg | Tm | Tc | Tm-Tc | ΔH cal/g |
|---|---|---|---|---|---|---|---|---|
| 24 | — | 60 | 40 | 94 | 264 | 189 | 75 | 6.35 |
| 25 | — | 50 | 50 | 85 | 215 | — | — | 3–4 |
| 26 | — | 70 | 30 | >100 | 300 | — | — | 4.6 |
| 27 | — | 76 | 24 | >100 | ~320 | — | — | — |
| 28 | 6 | 76 | 18 | — | ~320 | — | — | — |
| 29 | 7 | 70 | 23 | 104 | 305 | — | — | 4.9 |
| 30 | 48 | 45 | 7 | 86.5 | amorphous | — | — | — |
| 31 | 10 | 60 | 30 | 82 | 275 | 224 | 52 | 4.9 |
| 32 | 15 | 70 | 15 | 94 | 310 | — | — | — |
| 33 | 30 | 60 | 10 | 81.7 | 288 | 244 | 44 | 4.5 |
| 34 | 20 | 60 | 20 | 90 | 280 | 221 | 59 | — |

EXAMPLE 35

The example of "control no.1" in the Mitsui Patent (JP 156,130) shows a 12–6, T–6, I terpolyamide of molar composition 10/55/35 corresponding to a mass content shown below, a melting temperature of 280° C. and an HDT of 108° C. The polyamide of this example is then filled with glass fibres at a concentration of 40% and an HDT of 160° C. is obtained.

A 12–6, T copolyamide according to the present invention, of 49/51 mass composition and an inherent viscosity of 1.47 was filled with 40% of glass fibres with a mean length of 4.5 mm. The compounding was performed on a single-screw Kaufmann-Super 2–50, the rate of rotation of the screw is 90 rev/min, the stock temperature 311° C. and the stock throughput 26.4 kg/h.

The HDT (Heat Distortion Temperature), that is to say the temperature of deflection under load, is measured according to ASTM standard D 648 on 6.4×12.7×63.5 test specimens. These results are listed in the table below.

|  | Mitsui control example | 12-6,T copolyamide |
|---|---|---|
| 6,T mass % | 57 | 51 |
| 12, mass % | 8 | 49 |
| 6,I mass % | 35 | 0 |
| Melting temperature | 280° C. | 273° C. |
| HDT (1.82 MPa), unfilled | 108° C. | 62° C. |
| HDT (1,82 MPa), filled 40% of glass fibres | 160° C. | 180° C. |

Thus, the present invention provides polyamides whose high aliphatic unit content does not diminish the mechanical properties.

EXAMPLE 36

21.4 g of amino-12-dodecanoic acid, 20.65 g of terephthalic acid and 17.9 g of 1,8-diaminooctane (C8-diamine) are introduced into the reactor of example 1.

The reactor is immersed in a heating bath maintained at 245° C.; after 10 min the stirring is switched on (25 rpm). The reaction temperature is then raised to 280° C. (20 min). Polycondensation effluents are then observed to distill off, and the medium becomes transparent. The temperature of the bath is then raised to 300° C. over a period of 30 min; the viscosity of the medium increases. The stirring is decreased. The reaction is then stopped. The thus-obtained polyamide shows an inherent viscosity of 0.90, a melting temperature of 275° C. (one can detect on the DSC spectrum another peak at 245° C. with low amplitude) and a glass transition temperature of 80° C.

EXAMPLES 37 to 39

The same operating conditions as set forth in example 36 are used. The polyamides obtained present a weight composition as 12/8, T of 36/64; 39/61 and 42/58 respectively.

The results for examples 36 to 39 are summarized in the following table, wherein the percentages are given by weight.

| Ex. | 12 | 8,T | Tg | Tf | ΔH cal/g |
|---|---|---|---|---|---|
| 36 | 33 | 67 | 80 | 275 | 8.3 |
| 37 | 36 | 64 | 79 | 268 | 7.3 |
| 38 | 39 | 61 | 77 | 265 | 6.4 |
| 39 | 42 | 58 | 77 | 260 | 5.5 |

EXAMPLE 40

4.1 kg of lactam 12, 4.16 kg of terephthalic acid and 2.0 kg of HMDA (corresponding to 68% of the theory) are charged into an autoclaved reactor. The reactor is closed and the temperature is raised to 280° C. and maintained at said value for a period of 90 minutes (stirring: 30 rpm). The pressure sets to 24 bar into the reactor. Thereafter the reactor is submitted to a pressure relief to 1 bar, over a period of 60 minutes. Then is charged 0.86 kg of HMDA (i.e. an overall sum of 68+29=97% of the theory). The pressure in the reactor then increases to stabilize at about 7 bar. The reaction mixture is maintained at 280° C. for a period of 90 minutes. Then, an expansion and a raise in temperature are carried out simultaneously, in order to reach 320° C. and 1 bar, over a period of 65 minutes. The product, which is deficient in amine group (97% of the theoritical HMDA) is collected, cooled down and grinded (inherent viscosity of 0.60).

5 kg of this grinded product are blended, at a temperature of 80° C., with 0.10 kg of HMDA (i.e. the 3% left and a stoichiometric excess of 3% of functions NH$_2$/COOH). The thus-obtained powder is processed in a ZSK-30 extruder, having a feed temperature of 320° C. A polymer is thus obtained, said polymer having an inherent viscosity of 0.90, a melt temperature of 295° C., and a glass transition temperature of 85° C.

While the invention has been described in connection with a preferred embodiment, it is not intended to limit the scope of the invention to the particular form set forth, but on the contrary, it is intended to cover such alternatives, modifications, and equivalents as may be included as defined by the appended claims.

What is claimed is:

1. A polyamide comprising, on a mass basis:
   (a) 45 to 75% of an x,T unit, said unit being the condensation product of x, a diamine having 4 to 12 carbon atoms, and T, terephthalic acid, and said unit having the formula:

-NH-(CH$_2$)$_{1-12}$-NH-CO and
   (b) 55 to 25% of an aliphatic unit -HN-CH$_2$)$_n$-CO, n being between 6 and 14 inclusive.

2. The polyamide according to claim 1, comprising, on a mass basis:
   (a) 55 to 70% of x,T unit, and
   (b) 45 to 30% of aliphatic unit -HN-(CH$_2$)$_n$-CO.

3. The polyamide according to claim 2, wherein, in the x,T unit, x has between 6 and 9 carbon atoms inclusive.

4. The polyamide according to claim 3, wherein the x,T unit is the unit 6, T.

5. The polyamide according to claim 4, wherein, in the aliphatic unit -HN(CH$_{2n}$-CO, n is between 7 and 11 inclusive.

6. The polyamide according to claim 5, wherein the aliphatic unit is the unit 12, the unit, 11 or a mixture thereof.

7. The polyamide according to claim 6, wherein the aliphatic unit is the unit 12.

8. The polyamide according to claim 7, wherein the aliphatic unit 12 is from 12-aminododecanoic acid or the corresponding lactam.

9. The polyamide according to claim 1, further comprising units from a third monomer partly replacing the aliphatic unit, -HN-(CH$_2$)$_n$-CO, the said aliphatic unit -HN-(CH$_2$)$_n$-CO, being present in a proportion of at least 10% on a mass basis, based on the total mass.

10. The polyamide according to claim 9, wherein the said third monomer is the unit 6, I present in a proportion of up to 45% on a mass basis, based on the total mass.

11. The polyamide according to claim wherein the said unit 6, I is present in a proportion of up to 30% on a mass basis, based on the total mass.

12. The polyamide according to claim 9, wherein the said third monomer is the unit 6 which is from 6aminohexanoic acid or the corresponding lactam and present in a proportion of up to 40% on a mass basis, the unit x,T being present in a proportion of at least 50% on a mass basis, based on the total mass.

13. The polyamide according to claim 12, wherein the said unit 6 is present in a proportion of up to 30% on a mass basis, based on the total mass.

14. The polyamide according to claim 12 or 13, in which the unit 6 is from caprolactam.

15. The polyamide according to claim 10 wherein the aliphatic unit is present in a proportion of at least 15% on a mass basis, based On the total mass.

16. The polyamide according to claim 1, additionally containing at least one filler, a conventional additive or a mixture thereof.

17. The polyamide according to claim 16, containing glass fiber as filler.

18. A formed object obtained by shaping the polyamide according to claim 1.

* * * * *

UNITED STATES PATENT AND TRADEMARK OFFICE
CERTIFICATE OF CORRECTION

PATENT NO. : 5,422,418
DATED : June 6, 1995
INVENTOR(S) : Philippe Maj, et. al.

It is certified that error appears in the above-indentified patent and that said Letters Patent is hereby corrected as shown below:

Column 12, claim 1, formula in line 4, cancel "1-12" and substitute --4-12--;
Column 12, claim 12, line 41, insert a hyphen (-) between "6" and "amino"; and Column 12, claim 15, last line, second occurrence of "on", correct "On" to read --on--.

Signed and Sealed this

Twenty-second Day of August, 1995

Attest:

BRUCE LEHMAN

Attesting Officer

Commissioner of Patents and Trademarks